United States Patent

[11] 3,545,458

| [72] | Inventors | Donald R. Korb<br>80 Boylston St., Boston, 02130;<br>Harold R. Shurtleff, Sagamore,<br>Massachusetts |
|---|---|---|
| [21] | Appl. No. | 763,619 |
| [22] | Filed | Sept. 30, 1968 |
| [45] | Patented | Dec. 8, 1970 |
| [73] | Assignee | Said Shurtleff assignor to said Korb. |

[54] CONTACT LENS HANDLING APPARATUS
8 Claims, 6 Drawing Figs.

[52] U.S. Cl. ............................................. 134/86,
134/89, 134/92, 134/143, 134/145, 134/197, 206/5
[51] Int. Cl. ..................................... A45c 11/04, B08b 3/02
[50] Field of Search ........................................ 134/137, 138, 140, 143, 145, 154, 201, 86, 89, 92, 197; 206/5, 5(A); 15/214; 21/86, 87, 90, 99

[56] References Cited
UNITED STATES PATENTS

| 2,967,607 | 1/1961 | Hollinger ...................... | 206/5(A) |
| 3,035,589 | 5/1962 | King ............................ | 206/5(A)X |
| 3,113,579 | 12/1963 | Willis .......................... | 134/145 |
| 3,139,097 | 6/1964 | Hungerford et al. ........... | 134/145 |
| 3,253,702 | 5/1966 | Ray ............................. | 206/5(A) |
| 3,379,200 | 4/1968 | Pennel ......................... | 134/143 |
| 3,444,868 | 5/1969 | Hungerford et al. ........... | 134/143 |
| 3,462,301 | 8/1969 | Gershen ....................... | 206/5(A) |

*Primary Examiner*—Daniel Blum
*Attorney*—Willis M. Ertman

ABSTRACT: A contact lens support assembly includes a lens holding structure defining a pair of slots, the sides of which are open so that lenses may be inserted into and removed from the slots by grasping their edges. A lens protecting structure fits over the upper ends of the slots to secure the lenses in the slots and an actuator cooperates with a container in which the lens holding structure is disposed for moving that structure in the container to cause fluid flow across the lens surfaces in a cleaning action.

PATENTED DEC 8 1970
3,545,458
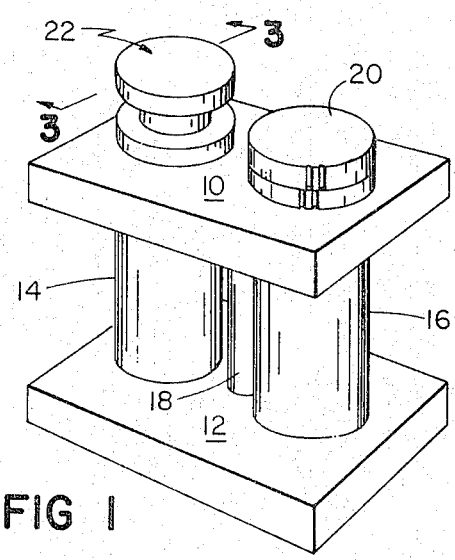
FIG 1
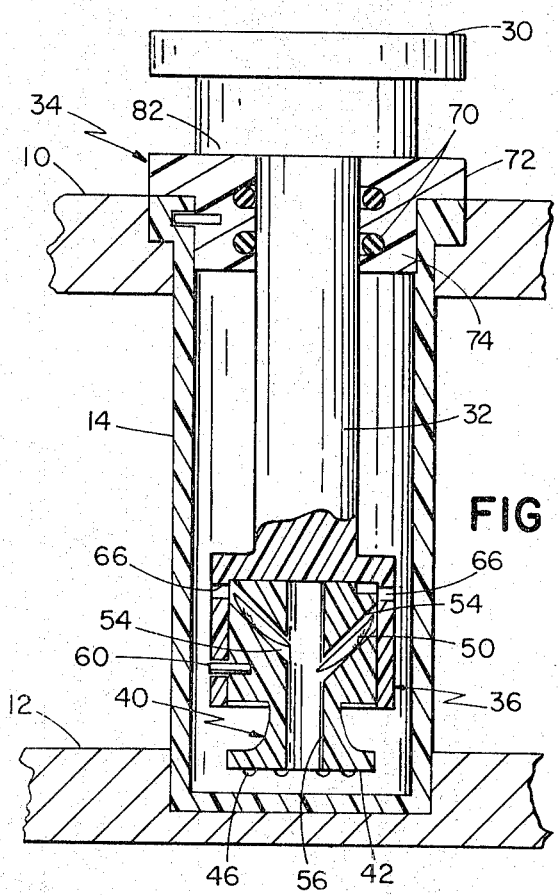
FIG 3
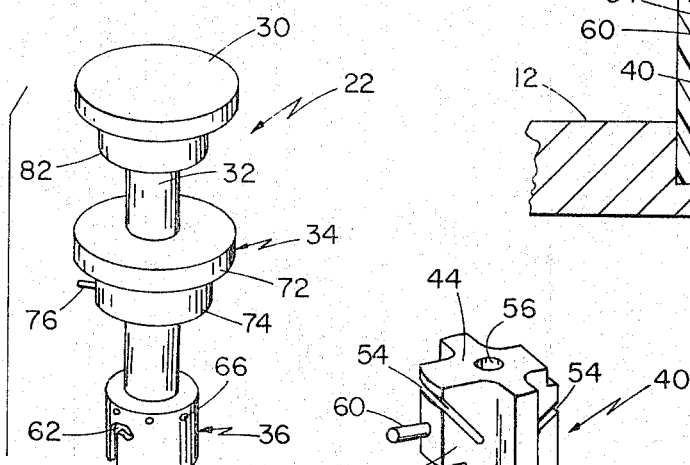
FIG 2
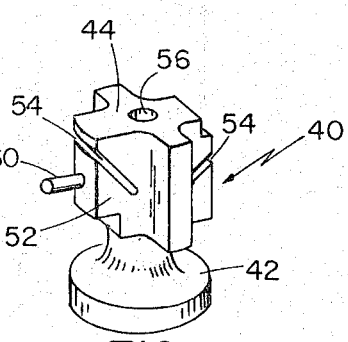
FIG 4
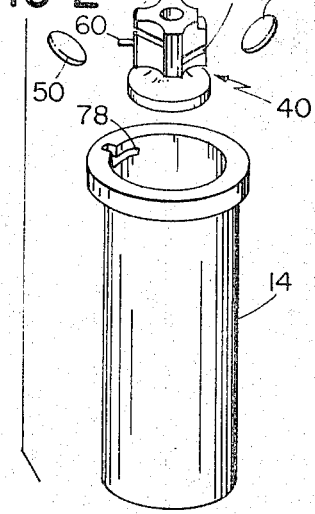
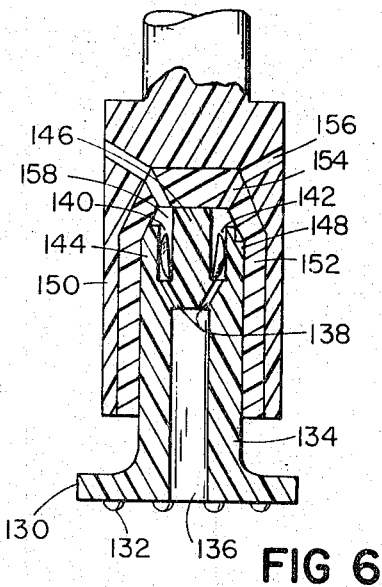
FIG 5
FIG 6

CONTACT LENS HANDLING APPARATUS

SUMMARY OF INVENTION

This invention relates to contact lens cleaning and soaking devices.

Contact lenses have many advantages over traditional eyeglasses, aesthetically, physically and optically. However, the care of contact lenses is a more difficult and important task than the care of eyeglasses. Contact lenses must be frequently cleaned, both to preserve the optical performance of the lenses and to avoid damage to the eye from contaminants on the lens surfaces picked up in handling and storage. The lenses require soaking when not in use to prevent the hardening of contaminants not cleaned from their surfaces and to keep the lenses in a hydrated state to eliminate the discomfort caused when a lens which is dry is undergoing moistening by the eye. Contact lenses are small and fragile and require careful handling to prevent loss or breakage.

A first frequently used method of cleaning the lenses was rubbing the fingers over the lens in the presence of a cleaning solution. This was found inadequate because of the contour of the lens, the likelihood of damage to the lens due to abrasion or chipping, and the likelihood that contaminants would be transferred from the fingers to the lens. Cotton swabs soaked in cleaning solution diminished some of these problems but increased handling difficulties. Both techniques involved the risk of dropping and possible loss inherent in the frequent handling of the lens in such manner. Recently, a device has come onto the market into which the lenses are placed for cleaning and storage in a combination cleaning-soaking solution without further handling of the lenses.

Such devices, however, have disadvantages of their own. The cleaning efficiency is low. Agitation during cleaning has a battering effect on the lenses which increases the danger of damage to the optical surface or even breakage. Placing the lens in the devices and removing them is often an awkward and clumsy process and it was difficult to distinguish the right and left lenses from one another. Typically, one using the device has his sight impaired by removing the lenses, making handling of the lenses and manipulation of the device difficult. Also such devices employ relatively large reservoirs of fluids and thus increase the operating expense as cleaning and soaking fluids are relatively expensive.

An object of this invention is to provide a novel and improved contact lens cleaning and storage assembly.

Another object of the invention is to provide a novel and improved contact lens storage assembly that is convenient to load and unload, permits ready identification of the lenses and protects the lenses while in storage.

Still another object of the invention is to provide a novel and improved contact lens cleaning unit that provides efficient cleaning in a convenient mode of operation with economical use of fluid.

A further object of the invention is to provide a contact lens cleaning and storage arrangement which permits identification of the left and right lenses in storage without visual cues.

Still another object of the invention is to provide a contact lens cleaning and storage arrangement of improved hygienic characteristics.

A further object of the invention is to provide an improved contact lens storage arrangement that is easy to flush rapidly and thoroughly.

Other objects of the invention are to provide a contact lens cleaning and soaking device which allows nonharmful and minimal handling of the lenses, which provides dependable, efficient and adequate cleaning, which provides for maximum utilization of costly cleaning and soaking fluids, which minimizes harmful battering of the lenses during cleaning, and which is compact, simple and inexpensive.

In accordance with the invention there is provided a contact lens support assembly that includes a lens holding member that includes structure defining a pair of slots, each proportioned to receive a contact lens, the depth of each slot being greater than the width of the slot defining structure so that the lenses may be inserted or removed merely by grasping the edges of the lens; a lens protecting member adapted to overlie the ends of the slots; and latch means cooperating with said holding member and the protecting member to latch the two member together so that the lenses in the support assembly are held and yet may be easily removed. Preferably tactile identification is provided to differentiate the slots from one another.

This support assembly has fluid passages through it when used in a cleaning unit. A predetermined path of cleaning motion is defined and the fluid passages are alined with that path so that cleaning motion forces the fluid through these passages. Straight cleaning motion is employed in the preferred embodiment but rotary or compound motion may also be employed. In such arrangements each slot is alined with the fluid passages so that a component of the fluid flow moves across the lens surfaces under the influence of the cleaning motion.

In a particular embodiment a contact lens cleaning and storage unit is provided which includes a support structure, and first and second containers mounted on said support structure, the first container being adapted to hold a cleaning solution and the second container being adapted to hold a soaking solution. A cap is provided on one of said containers, and a cleaning assembly in the other of said containers which includes a lens support assembly including a lens holding structure that defines a pair of slots, as above defined a major component of each slot being parallel to the corresponding major component of the other slot and a lens securing structure adapted to fit over the upper ends of said slots to secure contact lenses in place. The support assembly defines multiple fluid passages that communicate with the slots so that the lenses are directly in the fluid passages. A cap structure, interchangeable with the first cap, fits in sealing relation on the container and carries a shaft and handle that permits the lens support assembly to be reciprocated to cause fluid flow through said fluid passage means in an efficient lens cleaning action. After cleaning the cleaning assembly may be removed from the cleaning container, rinsed under tap water and inserted in the soaking container. This embodiment provides efficient cleaning, convenient soaking and safe storage of contact lenses in a compact and easy to use assembly.

Other objects, features, and advantages will appear from the following description of particular embodiments of the invention, taken together with the attached drawings thereof, in which:

FIG. 1 shows an assembled cleaning and soaking unit embodying the invention;

FIG. 2 is an exploded view of the cleaning apparatus of the unit shown in FIG. 1;

FIG. 3 is a sectional view of the cleaning apparatus along the line 3–3 of FIG. 1;

FIG. 4 is an enlarged view of the lens receiving plug shown in FIG. 3;

FIG. 5 shows an alternative embodiment of the lens receiving plug; and

FIG. 6 is a sectional view of another alternative embodiment of the cleaning apparatus embodying the invention.

DESCRIPTION OF PARTICULAR EMBODIMENTS

The cleaning and soaking unit shown in FIG. 1 includes top and bottom rectangular support plates 10 and 12, respectively, maintaining cylindrical cleaning solution container 14 and cylindrical soaking solution container 16. A support column 18, adjacent the soaking container, extends from one plate to the other. The soaking container is covered by cap 20 and a cleaning assembly generally designated 22 is shown inserted in the cleaning container.

Referring to FIGS. 2, 3, and 4, cleaning assembly 22 includes a handle, generally designated 30, a shaft 32, a container cap or sealing portion, generally designated 34 and a cleaning basket 36 formed at the end of shaft 32. A contact lens holding plug, generally designated 40, is insertable in securing basket 36 to form a lens support structure.

Contact lens holding plug 40 has a base 42 and a cruciform lens holding section 44 above the base. Support projections 46 hold the plug spaced from a surface on which it may be placed while out of container 14 or 16 and thus minimize contamination of the solutions from that source. The contact lenses 50 shown have diameters greater than the widths of the arms 52 of the cruciform section. In opposite arms 52 of the cruciform are formed slots 54 disposed at 45° angles to the assembly axis into which the contact lenses may be inserted merely by grasping two opposite edges of the lens. The depth of the slots is slightly greater than the diameter of the lenses. The plugs'- diagonal slots have substantial components alined with the vertical axis of motion of the cleaning assembly. The vertical locations of the two slots are different and one arm is notched so that the location of the right and left lenses in the holder may be identified tactilely. Bore 56, through the center of the plug, communicates with the slots.

When assembled, lens holding plug 40 is latched into lens securing basket 36 at the end of the cleaning assembly by a lock pin 60 projecting from one of the arms 52 which fits into a slot 62 in the securing basket. Radial passageway holes 66 in the wall of the cleaning basket communicate with the spaces between arms 52 when the lens holding plug 40 is inserted in securing basket 36.

The shaft 32 is slidably mounted in cap portion 34, Two sealing 0-rings 70 disposed in grooves in the cap portion 34 provide seals with shaft 32 at that point. The sealing portion includes a flange element 72, a neck 74, and a lock pin 76 projecting from the neck to latch the sealing portion to the top of either the cleaning container 14 or the soaking container 16. The lock pin fits in slot 78 on the inside of the container top when the cleaning apparatus is assembled so that the cleaning assembly and container are locked together. Stop surface 82 is provided below the handle 30.

FIG. 5 shows an alternative embodiment of the contact lens holding plug which has a base 100 of ¾-inch diameter and, above the base, a body 102 from which upwardly project a T-shaped center post 104 and two side posts 106, 108 of ⅛-inch width, slots 110, 112, 7/16-inch deep are defined between posts 104, 106 and 108. The inner wall of each slot is vertical and the outer wall is curved (5/16-inch radius) so that a minimum slot width of 0.062 inch is provided. The top surface 114 of body 102 is inclined at 70°to define recesses in which lenses 116 are received. Passages 122 provide fluid communication between base 100 and slots 110, 112. Arms 118, 120 of post 104 overhang slots 110, 112 and act to secure the lenses in the slots. Suitable tactile differentiation between the slots, by selective grooving, by shape of one arm or by shape of body 102, for example trapezoidal, is provided.

Still another embodiment is shown in FIG. 6. The plug has a base 130 on the bottom surface of which are spaced projections 132. Body 134 has a common passage 136 and individual passages 138 to slots 140, 142 formed between three spaced lens retaining members 144, 146, and 148, all narrower than the diameter of the contact lens that define two slots whose axes are parallel to the axis of motion of the cleaning assembly. The central member 146 is separated from the outer members 144 and 148 so that the two slots adequate to receive the lenses are defined. Member 148 is notched (as shown) or otherwise appropriately coded to allow tactile identification of the location of the right and left lenses.

Outer members 144 and 148 are sloped to accommodate a tapered recess in the securing basket 150 shown in FIG. 6. The tapered recess defines a chamber which protects the lenses held in the plug when that plug is inserted in basket 150. Insert 152 in basket 150 effectively decreases the cleaning chamber volume and permits the basket to accommodate smaller diameter contact lenses. The insert is omitted when the device is used with larger contact lenses. Fluid passageways 154 in insert 152 communicate with the fluid passageways 156 in the outer basket wall; and, via lens chamber 158 between the body 134 and the tapered recess wall of insert 152 and passages 138, with bore 136.

In operation of each embodiment, contact lenses 50 are placed in the slots of the plug. As the widths of the slot defining structures are less than the diameter of the lenses, the lenses may be inserted (and later removed) by grasping only the readily accessible edges of the lenses. Convenient handling of the lens without touching the optical surfaces thus results. The notches (or other suitable indicia) permit quick tactile identification of the lens holding slots. Similar suitable identification may be provided to tactilely distinguish the cleaning and soaking containers.

After the lenses are inserted in the plug, the plug is inserted and locked into securing basket. The cleaning assembly is then inserted into cleaning container 14, which has an appropriate cleaning fluid in it and the sealing cap portion 34 is locked by means of lock pin 76. The cleaning assembly is then reciprocated to wash the lenses.

With the plug and basket of the first embodiment, on the downstroke of the plunger cleaning fluid flow is through bore 56 and diverted by the lower surface of each lens across that surface parallel to the major plane of each lens to the spaces between the lens support arms and out the radial orifices 66. On each upward stroke of the plunger reduced pressure in bore 56 and in the area below basket 36 sucks fluid in through radial ports 66 and downwardly where it is deflected across the upper surfaces of the lenses. The flow determined by these fluid passageways creates a vigorous flow across the lens surfaces, a major component of the flow being essentially parallel to those surfaces, in an efficient cleaning action without risk of damage to the lenses as they are held in slots 54.

In the embodiments shown in FIGS. 5 and 6 the plug and plunger are similarly assembled and inserted in the cleaning container. The fluid flow for this embodiment on a plunger downstroke is up through plug bore and passageways into the slots where both surfaces of the lenses are washed by fluid flow along paths essentially parallel to the surfaces of the lenses. The flow continues on through the passageways in the basket (and inset insert if used). The direction of flow is reversed on the upstroke of the plunger.

After cleaning the lenses, the lens securing assembly is removed from container 14 and the cleaning fluid flushed from that assembly as by holding under a tap, cap 20 is removed from the soaking container which has an appropriate soaking fluid in it, and the cleaning assembly (plunger and plug) are placed in the soaking container 16. Cap 20 is placed on the cleaning container 14 to protect against spilling and contamination of the cleaning fluid.

The invention thus provides a cleaning assembly in which a component of the major planes of the lenses is alined with the direction of cleaning movement so that efficient cleaning action results in a lens holding unit of small cross-sectional configuration. The containers have correspondingly small cross sections and use reduced amounts of cleaning and soaking fluids.

Embodiments other than those disclosed will occur to those skilled in the art and are within the following claims.

We claim:

1. In a contact lens handling unit:
   an assembly having lens holding structure defining a pair of upwardly extending slots, the sides of said slots being open so that contact lenses may be inserted into said slots only by handling the lenses only on their edges;
   a lens protecting structure fitting over the upper ends of said slots to protect and secure contact lenses in said slots and coupled to said holding structure;
   fluid passageway defining means in said holding and protecting structures communicating with said lens retaining slots to provide fluid flow paths across the surfaces of contact lenses in said slots parallel to the major plane of said lenses as held in said slot;
   a cleaning fluid container in which said assembly is inserted; and actuator means secured to said assembly for providing fluid flow through said fluid passageway means and over the lens surfaces parallel to the plane of the lenses as held in said slots.

2. The apparatus of claim 1:

wherein said cleaning fluid container has a major axis;

said actuator means is for reciprocating said assembly axially in said container;

and said lens retaining slots retaining said lenses with a major component of the plane of said lenses parallel to said axis so that fluid flow is in a direction parallel to a major component of the plane of the lenses.

3. The apparatus of claim 1 in which said lens holding structure comprises a plug having a plurality of members of width less than the diameter of said lenses, said members defining said lens retaining slots, and said protecting structure is a housing for receiving said plug so that lenses in said slots are protected by said housing.

4. The apparatus of claim 3 in which said slots are disposed parallel to one another and parallel to said axis.

5. A contact lens cleaning and storage unit comprising a support structure:

first and second containers mounted on said support structure, said first container being adapted to hold a cleaning solution and said second container being adapted to hold a soaking solution;

a first cap on one of said containers;

a cleaning assembly in the other of said containers;

said cleaning assembly including a lens support assembly including a lens holding structure defining a pair of slots, the depth of said slots being greater than the width of said slots, said slots being adapted to receive a pair of contact lenses;

a lens protecting structure adapted to fit over the upper ends of said slots to protect contact lenses disposed in said slots;

tactilely sensitive configuration on said lens holding unit to enable differentiation between said slots;

said holding and protecting structures defining fluid passage means communicating with said slots;

a second cap adapter to fit on in sealing relation on said other container interchangeable with said first cap;

and an actuator carried by said second cap movable relative thereto for moving said lens holding unit to cause fluid flow through said fluid passage means in a lens cleaning action.

6. The apparatus of claim 5 wherein said slots allow said lenses to be inserted by handling the lenses only on their edges.

7. The apparatus of claim 5 wherein said actuator is a plunger reciprocable axially in said container and said slots retain said lenses with a major component of the planes of said lenses in parallel to said axis.

8. The apparatus of claim 5 and further including an insert adapted to fit into said protecting structure to permit use of a lens holding structure of smaller dimension.

UNITED STATES PATENT OFFICE
CERTIFICATE OF CORRECTION

Patent No. 3,545,458   Dated December 8, 1970

Inventor(s) Donald R. Korb and Harold R. Shurtleff

It is certified that error appears in the above-identified patent and that said Letters Patent are hereby corrected as shown below:

Column 4, line 41, delete "inset".

Column 5, line 19, "3" should be --2--.

SIGNED AND
SEALED
MAR 2 1971

(SEAL)
Attest:

Edward M. Fletcher, Jr.
Attesting Officer

WILLIAM E. SCHUYLER, JR
Commissioner of Patents